(12) United States Patent
Nainar et al.

(10) Patent No.: US 12,126,538 B2
(45) Date of Patent: *Oct. 22, 2024

(54) SYSTEMS AND METHODS FOR SOFTWARE DEFINED HYBRID PRIVATE AND PUBLIC NETWORKING

(71) Applicant: Verizon Patent and Licensing Inc., Basking Ridge, NJ (US)

(72) Inventors: Arun Kumar Arumuga Nainar, New Barnet (GB); Kam Lee Yap, Ashburn, VA (US); Klas Nilsson, Hasselby (SE); Karthikeyan Kandhasamy, Chennai (IN); Henry Schaefer, Berlin (DE); Kiran Kumar Vasudeva, Bengaluru (IN)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/310,986

(22) Filed: May 2, 2023

(65) Prior Publication Data
US 2023/0269190 A1  Aug. 24, 2023

Related U.S. Application Data

(63) Continuation of application No. 17/377,097, filed on Jul. 15, 2021, now Pat. No. 11,671,375.

(51) Int. Cl.
| | |
|---|---|
| H04L 47/2425 | (2022.01) |
| H04L 12/46 | (2006.01) |
| H04L 47/2441 | (2022.01) |
| H04L 47/2483 | (2022.01) |

(52) U.S. Cl.
CPC ...... H04L 47/2433 (2013.01); H04L 12/4633 (2013.01); H04L 12/4641 (2013.01); H04L 47/2441 (2013.01); H04L 47/2483 (2013.01)

(58) Field of Classification Search
CPC ............. H04L 12/4633; H04L 12/4641; H04L 47/2433; H04L 47/2441; H04L 47/2483
See application file for complete search history.

(56) References Cited

U.S. PATENT DOCUMENTS

| | | | | |
|---|---|---|---|---|
| 10,084,798 B2 * | 9/2018 | Looney | ................. | H04L 63/126 |
| 10,110,422 B2 * | 10/2018 | Yadav | ................. | H04L 43/0817 |
| 10,511,590 B1 * | 12/2019 | Bosch | .................... | H04L 63/20 |

(Continued)

*Primary Examiner* — Wutchung Chu

(57) ABSTRACT

Disclosed is a system comprised of different points-of-presence ("PoPs") that provide software defined hybrid private and public networking for different entity sites. A system PoP may establish and/or maintain different network circuits for accessing different destinations or services. The system PoP may receive a tunnel creation request from a particular site, may obtain entity-defined policies that are specified for the particular site, and may establish a particular network tunnel to the particular site. The system PoP may then route egress traffic with a first classification through a first network circuit with a different quality of service ("QoS") than egress traffic with a second classification according to the policies. Similarly, the system PoP may route ingress traffic arriving over the first network circuit through the particular network tunnel with a different QoS than ingress traffic arriving over the second network circuit according to the policies.

20 Claims, 10 Drawing Sheets

(56) References Cited

U.S. PATENT DOCUMENTS

| | | | |
|---|---|---|---|
| 11,388,225 B1* | 7/2022 | Duraj | H04L 63/0478 |
| 2005/0068942 A1* | 3/2005 | Chu | H04M 7/006 |
| | | | 370/352 |
| 2005/0160180 A1* | 7/2005 | Rabje | H04L 47/2408 |
| | | | 709/238 |
| 2005/0243789 A1* | 11/2005 | Dinello | H04L 63/0236 |
| | | | 370/341 |
| 2005/0256972 A1* | 11/2005 | Cochran | G06F 11/2071 |
| | | | 709/245 |
| 2007/0258456 A1* | 11/2007 | Khouderchah | H04L 65/1101 |
| | | | 370/392 |
| 2010/0251329 A1* | 9/2010 | Wei | H04L 67/1001 |
| | | | 726/1 |
| 2012/0155298 A1* | 6/2012 | Yang | H04W 24/08 |
| | | | 370/252 |
| 2012/0240185 A1* | 9/2012 | Kapoor | H04L 41/0866 |
| | | | 726/1 |
| 2013/0145152 A1* | 6/2013 | Maino | H04L 61/5084 |
| | | | 726/4 |
| 2013/0311671 A1* | 11/2013 | Luo | H04L 12/4633 |
| | | | 709/233 |
| 2015/0146567 A1* | 5/2015 | Ylimartimo | H04L 61/2575 |
| | | | 370/254 |
| 2017/0359265 A1* | 12/2017 | Bosch | H04L 67/1076 |
| 2018/0176779 A1* | 6/2018 | Cao | H04W 40/24 |
| 2019/0036687 A1* | 1/2019 | Raza | H04L 45/42 |
| 2019/0058653 A1* | 2/2019 | Mirsky | H04L 45/245 |
| 2019/0090174 A1* | 3/2019 | Rocci | H04W 48/02 |
| 2019/0313318 A1* | 10/2019 | Pawar | H04M 15/62 |
| 2020/0053155 A1* | 2/2020 | Shi | G06N 5/046 |
| 2020/0059457 A1* | 2/2020 | Raza | H04L 69/14 |
| 2020/0177503 A1* | 6/2020 | Hooda | H04L 45/64 |
| 2020/0177629 A1* | 6/2020 | Hooda | H04L 47/125 |
| 2020/0296026 A1* | 9/2020 | Michael | H04L 43/08 |
| 2020/0314212 A1* | 10/2020 | Branch | H04L 12/4633 |
| 2020/0322259 A1* | 10/2020 | Sung | H04L 45/245 |
| 2022/0006726 A1* | 1/2022 | Michael | H04L 45/24 |
| 2022/0070102 A1* | 3/2022 | Wang | H04L 61/5007 |
| 2022/0131806 A1* | 4/2022 | Akl | H04L 47/24 |
| 2022/0210225 A1* | 6/2022 | Shilimkar | H04L 12/4633 |
| 2022/0278917 A1* | 9/2022 | Voderbet | H04L 43/0829 |

* cited by examiner

SYSTEMS AND METHODS FOR SOFTWARE DEFINED HYBRID PRIVATE AND PUBLIC NETWORKING

CROSS-REFERENCE TO RELATED APPLICATION

This Application is a Continuation of U.S. patent application Ser. No. 17/377,097, filed on Jul. 15, 2021, titled "SYSTEMS AND METHODS FOR SOFTWARE DEFINED HYBRID PRIVATE AND PUBLIC NETWORKING," the contents of which are herein incorporated by reference in their entirety.

BACKGROUND

Different networks, routes, etc. may be used to separate traffic associated with a set of services, applications, and/or data (e.g., confidential or mission-critical traffic) from traffic associated with another set of services, applications, and/or data (e.g., content streaming traffic or other traffic), and/or to prioritize the routing of the traffic. For instance, an enterprise may provision a network (e.g., a private Internet Protocol ("IP") network) for different enterprise sites to communicate with one another and/or to access on-premises or locally hosted services, applications, and/or data. The enterprise sites may also have another network (e.g., a public IP network) for accessing external sites, services, and/or applications. However, as more services, applications, and/or data migrate from on-premises hosted devices to "cloud" systems and/or remote data centers that are accessible via the public IP network, the delineation and management of the different traffic and/or networks at the various sites becomes increasingly more difficult.

DETAILED DESCRIPTION OF EXAMPLE EMBODIMENTS

The following detailed description refers to the accompanying drawings. The same reference numbers in different drawings may identify the same or similar elements.

Embodiments described herein provide systems and methods for software defined hybrid private and public networking. The software defined hybrid private and public networking may automatically manage separate circuits, that may include dedicated network channels or network paths, for different entities (e.g., enterprise entities, institutional entities, subscriber entities, or the like) within distributed points-of-presence ("PoPs"). Each entity may access a particular PoP from an entity site via one or more tunnels, connections, and/or circuits. The particular PoP may configure and/or manage network circuits on behalf of the entity or the entity site, and may automatically implement routing, quality-of-service ("QoS"), circuit selection, and/or other traffic management policies on behalf of the entity at the particular PoP with little or no change to the traffic management policies at the entity or routers of the entity site. For instance, the PoP associated with a given entity may route different types of egress traffic originating from one or more sites associated with the entity across different circuits with different QoS parameters according to entity-defined policies (e.g., where different entities may be associated with different policies), and may deliver different types of ingress traffic from the different circuits over the one or more tunnels, connections, and/or circuits to the entity site with the specified QoS according to the policies.

Consequently, the software defined hybrid private and public networking, in accordance with some embodiments, may minimize or eliminate the overhead associated with managing separate circuits for private data network traffic and public data network traffic at each entity site, and/or may remove the overhead associated with configuring policies to securely route and provide different QoS parameters for different traffic at each site. The software defined hybrid private and public networking of some embodiments may accept a single set of policies that are defined by a particular entity, and may effectuate that set of policies for egress and ingress traffic at all or selected sites of the particular entity through the PoPs.

Figure 1:
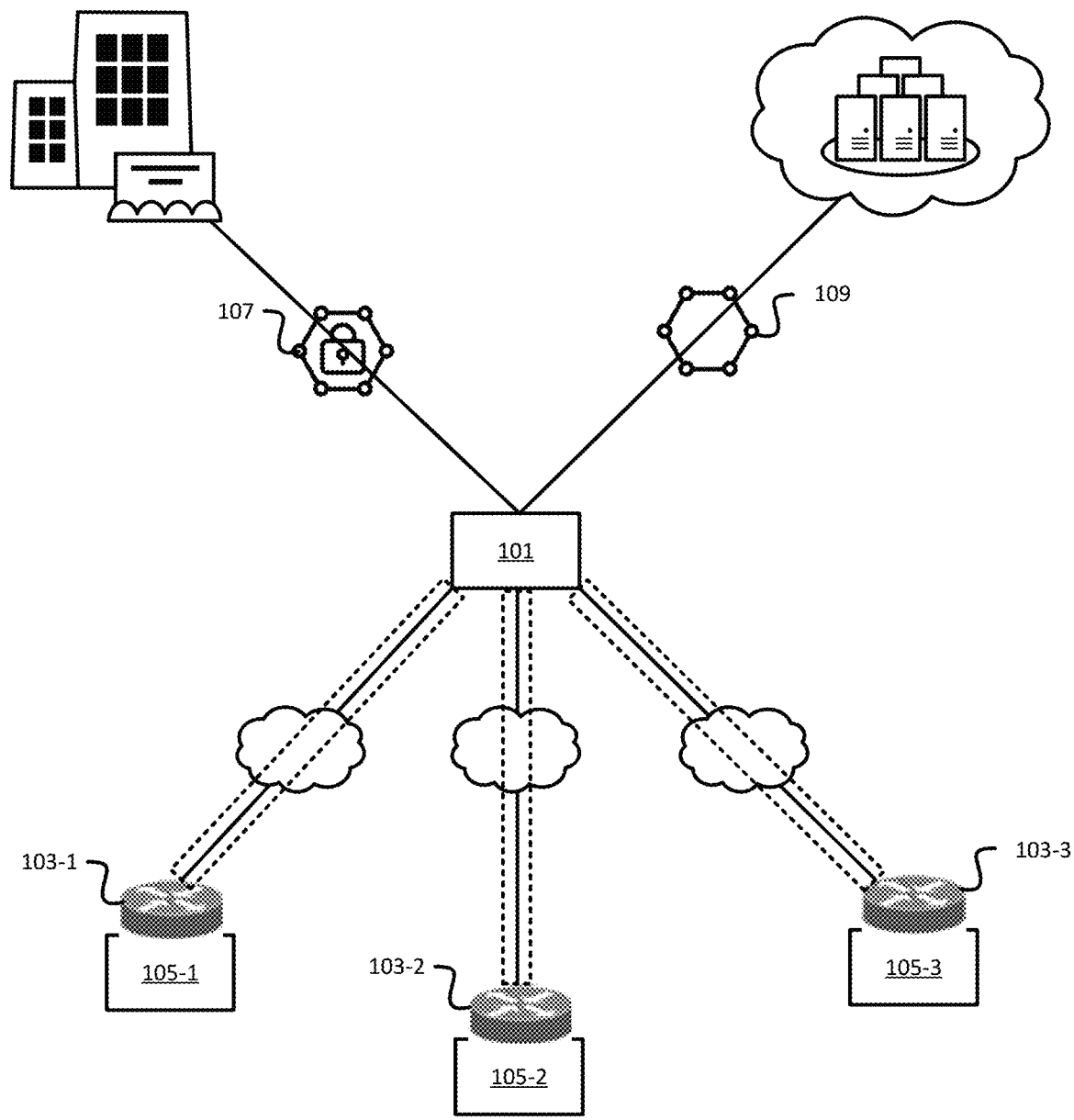
FIG. 1 illustrates an example of performing hybrid private and public networking for a particular site from remote a point-of-presence ("PoP") in accordance with some embodiments presented herein.

FIG. 1 illustrates an example of performing the hybrid private and public networking for an entity site from remote PoP 101 in accordance with some embodiments presented herein. PoP 101 may be connected to site equipment 103, which may also be referred to as customer-premises equipment ("CPE") 103-1, 103-2, and 103-3 at different entity sites 105-1, 105-2, and 105-3 (herein sometimes collectively referred to as "sites 105" or individually as "site 105"). PoP 101 may include one or more traffic management devices that dynamically control the routing of network traffic to and from sites 105 according to entity-defined policies for sites 105.

Each site 105 may correspond to a different geographical location, such as an office, a facility, and/or some other location from which one or more user devices may access various services, applications, and/or data from other sites, hosts, networks, and/or devices via one or more private network circuits 107 and/or public network circuits 109 managed by PoP 101. In some embodiments, private network circuit 107 may provide Private Internet Protocol ("PIP") services, Virtual Private Network ("VPN") services, secure connectivity services, and/or other suitable services to other sites 105 of a common entity (e.g., enterprise locations, enterprise data centers, etc.) and/or some other entity (e.g., a trusted entity). In some embodiments, private network circuits 107 may provide one or more reserved and/or dedicated network paths for mission-critical, confidential, and/or other prioritized services, applications, and/or data. The reserved and/or dedicated network paths may be used to prevent data packets for other services, applications, and/or data from being routed through private network circuits 107. In other words, private network circuits 107 may traverse network hops or links that are not connected to external data networks or publicly accessible data networks such as the Internet. In some embodiments, public network circuits 109 may provide one or more circuits or network paths for accessing services, applications, and/or data from external data networks and/or publicly accessible data networks such as the Internet. Public network circuits 109 may be used to exchange network traffic with cloud service providers, third-party sites, and/or other devices that are not connected to or accessible from private network circuits 107.

Each site 105 may include at least one CPE 103. CPEs 103 may include one or more routers, network switches, gateways, and/or other network equipment for providing network access to the user devices in each respective site 105.

Each CPE 103 may connect to PoP 101 using one or more circuits, and may establish one or more network tunnels over the established circuits to PoP 101. Each network tunnel may encrypt and/or otherwise secure the network traffic between a corresponding site 105 and PoP 101. In some embodiments, the circuit connecting CPE 103 to PoP 101 may include a configured static route that causes CPE 103 to route all network traffic to PoP 101 via that circuit. In some embodiments, the circuit connecting CPE 103 to PoP 101 may include a single external port or a single external link through which CPE 103 routes the egress network traffic from site 105 through PoP 101 before that traffic is routed by PoP 101 over other circuits, paths, and/or network links to reach their intended destinations. Similarly, the single external port or the single external link may be used to receive the ingress network traffic for site 105 that PoP 101 aggregates from the different circuits, paths, and/or network links.

The one or more circuits between each CPE 103 and PoP 101 may be established using different network connections and/or protocols, and may traverse different network hops or links. For instance, in some embodiments, a circuit connecting the devices in entity site 105-1 to PoP 101 may include an Ethernet Virtual Connection ("EVC") that is established over an Ethernet network. In some embodiments, a circuit connecting the devices in entity site 105-2 to PoP 101 may include an IP Security ("IPsec") tunnel that is established over a broadband, wireless, or other link (e.g., a Fifth Generation ("5G") link, a Long-Term Evolution ("LTE") link, etc.). In some embodiments, a circuit connecting the devices in entity site 105-3 to PoP 101 may implement a Point-to-Point Protocol ("PPP") technique, a Layer Two Tunneling Protocol ("L2TP") technique, a Multiprotocol Label Switching ("MPLS") technique, or other private connection tunneling technique. In some embodiments, PoP 101 may establish circuits to other sites 105 using other network tunnels, connections, protocols, and/or networks.

PoP 101 may receive different types of network traffic from the devices in sites 105 via the established circuits. The network traffic may include PIP network traffic and public IP network traffic, traffic with different security concerns, traffic with different performance requirements, traffic that uses different network protocols, data packets for different services, applications, and/or data, data packets that are tagged with different QoS classifications, and/or other classifications of network traffic.

PoP 101 may classify the received traffic. The classification may be based on source and/or destination network addressing, network protocols, markers and/or identifiers tagged as part of the data packets, header parameters, properties of the originating device (e.g., user agent, device signature, etc.), Uniform Resource Locators ("URLs"), and/or identifying information included as part of the data packets.

PoP 101 may route the received egress traffic through private network circuits 107 or public network circuits 109, and may control the rate at which the traffic is passed through circuits 107 and 109 based on the egress traffic classification and policies that are defined for the classifications and that are applicable to egress traffic from sites 105. For instance, a first set of data packets may receive a first classification for high priority and secure internal communications, a second set of data packets may receive a second classification for a mission-critical service that is hosted by a cloud service provider, and a third set of data packets may receive a third classification for regular Internet traffic. PoP 101 may route the first set of packets through a particular private network circuit 107, may route the second set of packets through a particular public network circuit 109 with a first QoS using a secure network protocol (e.g., IPsec), and may route the third set of packets through the particular public network circuit 109 with a second QoS, that receives a lower priority or less resources than the first QoS, using an unsecure network protocol.

PoP 101 may similarly distribute ingress traffic that is received from private network circuits 107 and/or public network circuits 109 through the one or more circuits that connect to a particular site 105 based on the ingress traffic classification and the policies that are defined for the classifications and that are applicable to ingress traffic to sites 105. For instance, PoP 101 may receive response data packets to each of the first, second, and third sets of data packets, and/or traffic that is otherwise addressed to devices connected via a respective CPE 103 associated with the particular site 105. PoP 101 may reserve a certain percentage of bandwidth in the single circuit to the particular site 105 exclusively for transfer of the response data packets to the first set of data packets received from the particular private network circuit 107 based on a first set of ingress policies defined for the first set of data packets and/or the first classification, may prioritize the remaining bandwidth for the response data packets from the mission-critical service that is hosted by the cloud service provider based on a second set of policies defined for the second set of data packets and/or the second classification, and may use the remaining bandwidth to perform a best-effort delivery of the response data packets to the third set of data packets based on a third set of policies defined for the third set of data packets and/or the third classification. The policies controlling the distribution of the ingress traffic may be defined by the entity operating CPE 103 and/or sites 105, and may be dynamically applied when establishing the tunnel connecting PoP 101 to CPE 103 of the particular site 105 and/or tunnels connecting PoP 101 to CPEs of other sites 105 operated by a common entity.

Accordingly, PoP 101 may apply the same set of policies for all sites 105 of a particular entity without having to individually configure and manage the policies at each CPE 103 of each site 105. In some embodiments, sites 105 of the particular entity may be geographically distributed such that sites 105 may connect to different PoPs 101. In some such embodiments, the policies that are defined by the particular entity and/or for sites 105 of the particular entity may be uploaded to an authentication, authorization, and/or accounting ("AAA") management device or other Operations Support System and Business Support System ("OSS/BSS") device, and the AAA management device or OSS/BSS device may distribute the policies to the two or more PoPs 101 that have established circuits with sites 105 so that the network traffic to and from all sites 105 is routed according to the same or a consistent set of entity-defined policies.

Figure 2:
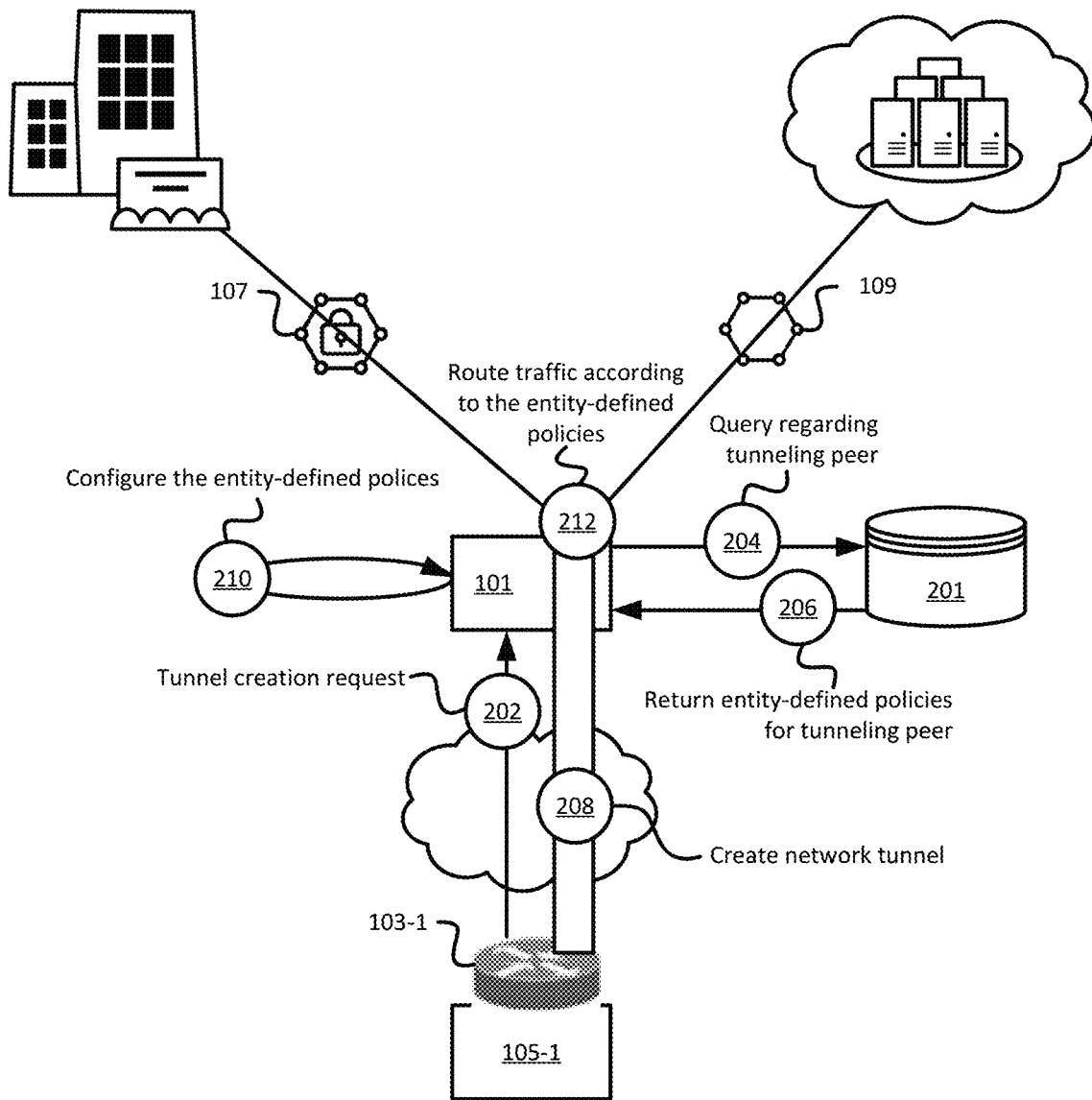
FIG. 2 illustrates an example of configuring policies that control the hybrid private and public network routing performed for a particular site by a PoP in accordance with some embodiments presented herein.

FIG. 2 illustrates an example of configuring entity-defined policies that control the hybrid private and public network routing performed for a particular site 105-1 by PoP 101 in accordance with some embodiments presented herein. CPE 103-1 may establish a connection with PoP 101 to allow PoP 101 control over the routing of ingress traffic entering particular site 105-1 and the egress traffic exiting particular site 105-1. To establish the connection, CPE 103-1 may issue (at 202) a tunnel creation request to PoP 101 upon initialization (e.g., power up) and/or activation. In some embodiments, CPE 103-1 may be configured with a network address that identifies PoP 101 as an IPsec peer, and CPE 103-1 may establish an IPsec tunnel with PoP 101 according to the Internet Key Exchange ("IKE") protocol.

PoP 101 may request (at 204) information about the tunneling peer from AAA management device 201 in response to receiving (at 202) the tunnel creation request from CPE 103-1. In some embodiments, PoP 101 may query a Remote Authentication Dial-In User Service ("RADIUS") server that acts as AAA management device 201 using information within the tunnel creation request message. For instance, PoP 101 may query the RADIUS server using the network address, digital certificate, and/or other authentication information that CPE 103-1 provides to PoP 101 during the IKE phase one negotiation.

AAA management device 201 may identify CPE 103-1, particular site 105-1 at which CPE 103-1 operates, and/or a particular entity that operates particular site 105-1, and may provide (at 206) PoP 101 with policies that are defined for CPE 103-1, particular site 105-1, and/or the particular entity. The policies may include routing policies, QoS policies, and/or other policies that are specifically associated with site 105-1, such as policies that are specified by an entity associated with site 105-1, and/or that control the distribution of network traffic to and particular site 105-1 and/or the distribution of network traffic to and from other sites of the same entity. For instance, the particular entity may define the same set of policies to control the distribution of network traffic to and from sites 105-1, 105-2, 105-3, and/or other sites 105 connected to PoP 101 and/or other PoPs performing the hybrid private and public network routing.

In some embodiments, the policies may be defined as one or more virtual routing and forwarding ("VRF") instances for routing the traffic originating from CPE 103-1 or particular site 105-1. More specifically, the policies may specify different bandwidth allocations, traffic prioritizations, and/or other QoS parameters for different types of traffic or differently classified data packets. For instance, the policies may define routing decisions based on the Differentiated Services Code Point ("DSCP") within the IP header. In some embodiments, traffic classifying devices (e.g., CPE 103-1 and/or other differentiated services-aware routers) may inspect data packets that originate from particular site 105-1 or that originate from other sites 105 and are destined for particular site 105-1, may classify the data packets based on configured Deep Packet Inspection ("DPI") signature packs, and/or may populate the DSCP header of the data packets with different markers or identifiers that are specified in the DPI signature packs for the different traffic classes or classifications. For instance, a first configured signature pack may specify marking Voice-over-IP ("VoIP") data packets with the Assured Forwarding ("AF") class identifier (e.g., AF41 marker) and data packets from a particular social media site with the Expedited Forwarding ("EF") or the Best Effort ("BE") class identifier. A different second configured signature pack may specify marking the VoIP data packets with the BE class identifier and may specify marking the particular social media site data packets with an Expedited Forwarding ("EF") class identifier. These different class identifiers may be used to differentiate traffic for routing, QoS, prioritization, and/or other purposes. In some embodiments, the same signature packs may be configured for CPEs, routers, and/or network devices on the same private circuit, under control of a common entity (e.g., the particular entity or an enterprise), and/or that are used for accessing the same set of services, applications, and/or data. In some embodiments, the policies may also specify an amount of bandwidth, QoS parameters, and/or other rules that control how the different classified data packets are to be routed over different circuits.

PoP 101 may complete (at 208) the tunnel establishment procedure. Completing (at 208) the tunnel establishment procedure may include creating a secure network tunnel that connects particular site 105-1 to PoP 101.

PoP 101 may dynamically configure (at 210) the policies for the created tunnel. PoP 101 may route (at 212) egress network traffic originating from particular site 105-1 over one of private network circuits 107 or public network circuits 109 at different rates and/or with different QoS according to the configured (at 210) policies, and may route (at 212) ingress network traffic arriving at PoP 101 from private network circuits 107 and public network circuits 109 at different rates and/or with different QoS over the established tunnel according to the configured (at 210) policies.

Figure 3:
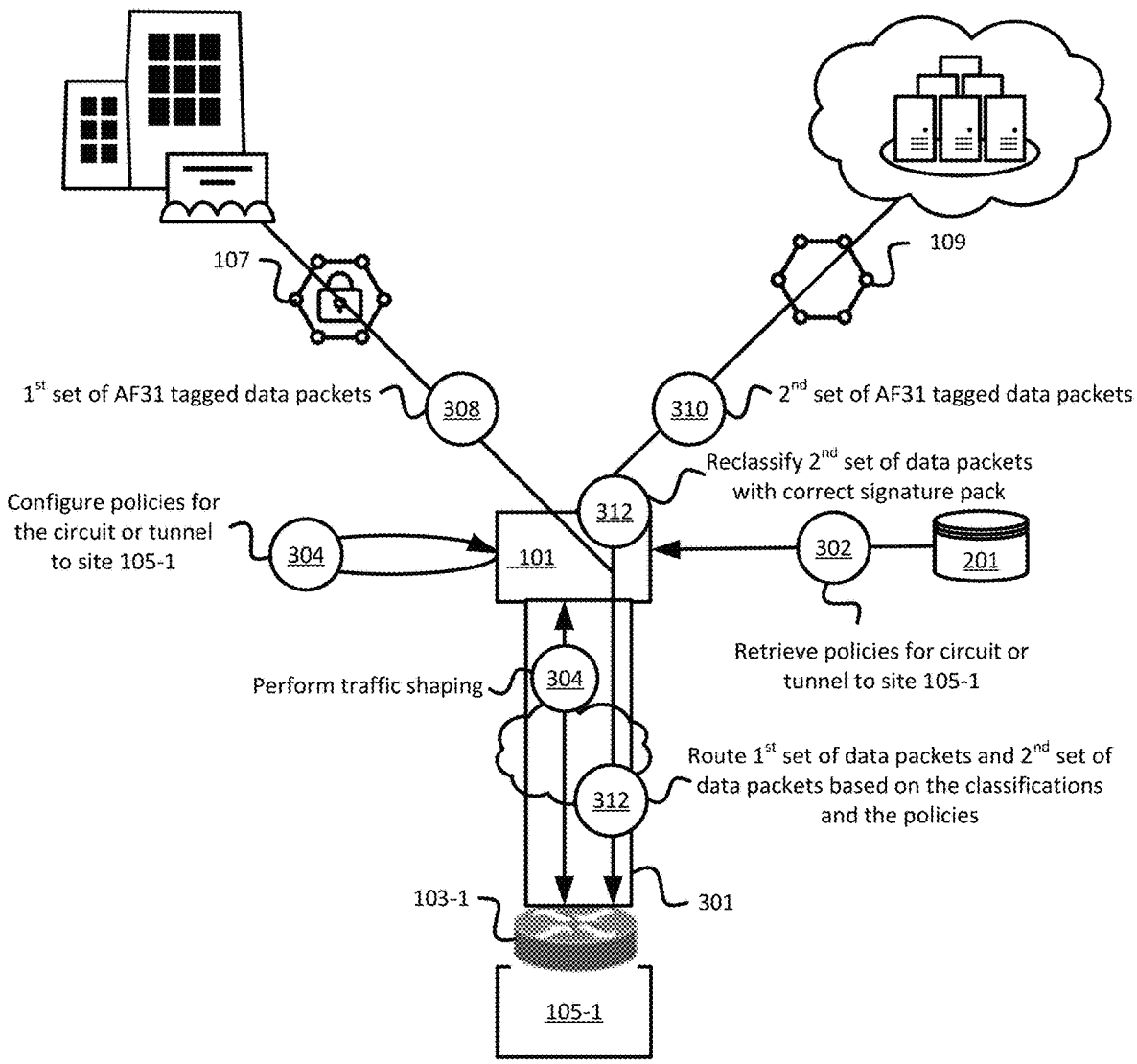
FIG. 3 illustrates an example of a PoP dynamically allocating bandwidth from a tunnel to a particular site based on different classified traffic and policies configured for that tunnel and/or entity site in accordance with some embodiments presented herein.

FIG. 3 illustrates an example of PoP 101 dynamically allocating bandwidth from a tunnel to particular site 105-1 based on different classified traffic and policies configured for that tunnel and/or particular site 105-1 in accordance with some embodiments presented herein. As shown in FIG. 3, PoP 101 may retrieve (at 302) policies for the particular circuit or particular tunnel 301 that is established between PoP 101 and CPE 103-1, and may configure (at 304) the policies to control the routing of traffic to and from particular entity site 105-1. The policies may specify reserving 20% of available bandwidth on the particular circuit or particular tunnel 301 for data packets that are tagged with an AF31 class identifier, and using the remaining bandwidth to prioritize delivery of data packets that are tagged with an AF11 class identifier over data packets that are tagged with a BE class identifier. PoP 101 may select the different policies to apply to the data packets based on the different class identifiers that are tagged to the data packets. In other words, the routing, QoS, and/or traffic management policies may be defined relative to the class identifiers and/or other identifiers by which PoP 101 may differentiate the data packets.

PoP 101 may send test traffic at different rates from PoP 101 to CPE 103-1 via the particular circuit or particular tunnel 301 to measure the total bandwidth of the particular circuit or particular tunnel 301. PoP 101 may perform (at 306) traffic shaping on the particular circuit or particular tunnel 301 based on the bandwidth measurements and/or the policies. Performing (at 306) the traffic shaping may include dynamically allocating the bandwidth of the particular circuit or particular tunnel 301 for the different classified traffic according to the minimum amounts, prioritization, and/or other QoS parameters specified within the policies. For instance, in response to measuring 10 megabits per second ("Mbps") of total bandwidth on the particular circuit or particular tunnel 301, PoP 101 may reserve at least 20% or 2 Mbps of the bandwidth for the distribution of AF31 tagged data packets, and may dynamically allocate the remaining bandwidth between different classified traffic that targets a destination device in particular site 105-1. Alternatively, the policies may specify reserving a minimum of 2 Mbps of the bandwidth for the distribution of AF31 tagged data packets and distributing other tagged data packets with the remaining bandwidth or with unused amounts of the reserved bandwidth.

As shown in FIG. 3, PoP 101 may receive (at 308) a first set of data packets from private network circuit 107. The first set of data packets may be directed to one or more devices at particular site 105-1, and may be tagged with the AF31 class identifier. Private network circuit 107 may correspond to a private IP network circuit or a trusted circuit that exchanges data packets between known or controlled endpoints. Since the first set of data packets originate from a trusted circuit (e.g., private network circuit 107) with routers or other CPEs that use a common set of criteria to classify data packets (e.g., the same DPI signature packs), PoP 101 may use the provided AF31 class identifiers to route the first set of data packets over the particular circuit or particular tunnel 301 to particular site 105-1.

PoP 101 may also receive (at 310) a second set of data packets from public IP network circuit 109 that are directed to one or more devices at particular site 105-1 and that are tagged with the AF31 class identifier. PoP 101 may receive (at 310) the second set of data packets at or near the same time as the first set of data packets such that both sets of data packets are competing for bandwidth of the particular circuit or particular tunnel 301.

The second set of data packets may originate from an untrusted circuit (e.g., public IP network circuit 109) that includes routers that may use different criteria or DPI signature packs to classify the data packets. Accordingly, PoP 101 may reclassify (at 312) the second set of data packets using the same DPI signature pack as CPE 103-1 and/or routers within private network circuit 107, and/or the same DPI signature pack from which the policies are defined.

To reclassify (at 312) the second set of data packets, PoP 101 may inspect and tag the second set of data packets according to the DPI signature pack from which the policies are defined to ensure that the data packets are routed correctly and/or consistently across the circuits. As shown in FIG. 3, PoP 101 may replace the AF31 class identifier in the second set of data packets after inspecting the data packets and determining that the second set of data packets include traffic from a particular URL or site that should be tagged with the BE identifier.

PoP 101 may route (at 314) the first set of data packets and the reclassified second set of data packets according to the policies that are configured for the particular circuit or particular tunnel 301. In particular, PoP 101 may allocate 20% of the available bandwidth on the particular circuit or particular tunnel 301 for the distribution of the first set of data packets, and may divide the remaining 80% of the available bandwidth for distribution of the first set of data packets and the second set of data packets, such that the distribution of the first set of data packets is prioritized relative to the distribution of the second set of data packets as provided for in the configured policies.

In some embodiments, PoP 101 may perform traffic shaping for the egress traffic that is to be routed across private network circuits 107 and/or public network circuits 109. For instance, the signature pack used by CPE 103-1 may tag a first set of egress data packets for a mission-critical service with the AF31 class identifier or marker, and may tag a second set of egress data packets with different identifiers or markers. The first set of egress data packets and the second set of egress data packets may be addressed to a destination that is reachable via private network circuit 107, and the policies configured at PoP 101 for particular site 105-1 or the particular circuit or particular tunnel 301 may include a policy that prioritizes sending all of the first set of egress data packets (e.g., data packets with the AF31 class identifier or marker) prior to sending any of the second set of egress data packets. Alternatively, the configured policies may cause PoP 101 to route the first set of egress data packets (e.g., data packets with the AF31 class identifier or marker) exclusively across a first private network circuit 107 using all available bandwidth, and to route the second set of egress data packets across a second private network circuit 107 that carries other tagged data packets and may therefore be more congested than the first private network circuit 107.

Figure 4:
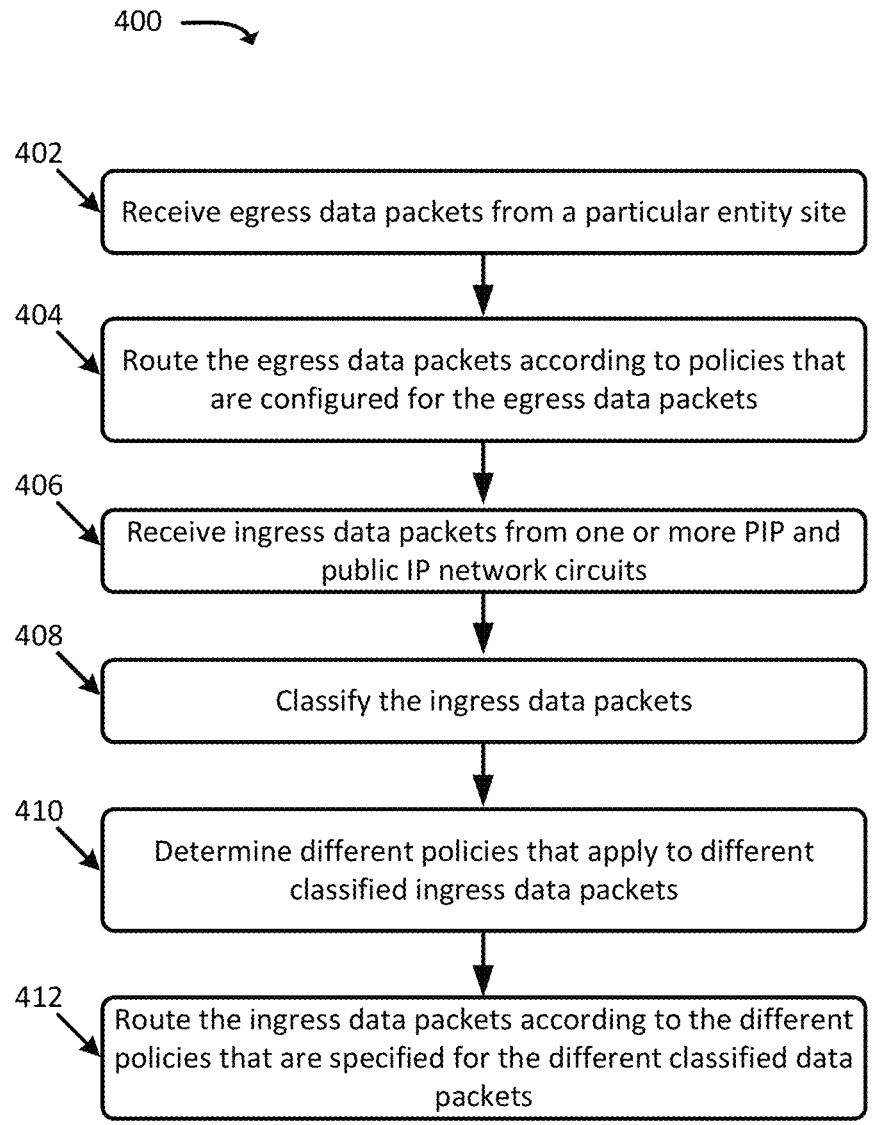
FIG. 4 presents a process for the dynamic hybrid private and public network circuit routing in accordance with some embodiments presented herein.

FIG. 4 presents a process 400 for the dynamic hybrid private and public network circuit routing in accordance with some embodiments presented herein. Process 400 may be implemented at PoP 101 by one or more traffic management devices operating therein.

Process 400 may include receiving (at 402) one or more egress data packets. Egress data packets may include data packets that originate from a tunnel or a circuit that directly connects PoP 101 to a particular entity site, and that are intended for a destination reachable via one of several private network circuits and public IP network circuits that are managed by PoP 101. The egress data packets may include data packets for different services, applications, and/or data being accessed by one or more devices at the particular entity site. Moreover, the egress data packets may be encapsulated using different network protocols, may specify different destinations (e.g., different destination network addresses or different URLs), and/or may be issued with different QoS parameters.

Process 400 may include routing (at 404) the egress data packets according to policies that are configured for the egress data packets. Routing (at 404) the egress data packets according to the policies may include reserving different amounts of bandwidth from an external private network circuit or public IP network circuit to allocate to different egress data packets, and/or prioritizing the distribution of certain egress data packets on the circuit over other egress data packets based on the configured policies. For instance, PoP 101 may receive (at 402) a plurality of egress data packets that are addressed to a destination that is reachable via a particular private network circuit. PoP 101 may buffer a first set of the egress data packets in order to reserve routing resources and/or bandwidth of the particular private network circuit for a second set of the egress data packets that are tagged or classified differently than the first set of egress data packets. Once the second set of egress data packets have been routed through the particular private network circuit, PoP 101 may route the first set of egress packets through the same particular private network circuit. In this manner, PoP 101 may adhere to the policies, and may reduce latency of the second set of egress data packets relative to the first set of egress data packets. In some embodiments, routing (at 404) the egress data packets may include prioritizing different circuits to a common destination, host, or other site based on the configured policies. For instance, the destination address for a particular egress data packet may be directed to a device, host, or other site that is reachable via two or more private network circuits managed by PoP 101. PoP 101 may select a particular private network circuit from the two or more private network circuits based on the tagging or classification of the particular egress data packet and the one or more policies configured for that tagging or classification.

In some embodiments, routing (at 404) the egress data packets may include implementing security policies, that are defined as part of the policies, on the egress data packets. Implementing the security policies may include ensuring that certain types of data packets or data packets with certain values or content are not permitted to pass through certain circuits. Accordingly, the policies may include different security controls for different egress circuits. In some embodiments, PoP 101 may include a firewall application or device to inspect and filter the data packets that violate the security policies defined for the different circuits.

Process 400 may include receiving (at 406) one or more ingress data packets. Ingress data packets may include data packets arriving on a private network circuit or a public IP network circuit that is managed by PoP 101, and may include data packets that are addressed to one or more devices at the particular entity site. The ingress data packets may be for a mix of applications, services, and/or data being accessed by the one or more devices at the particular entity site. This includes ingress data packets for a first set of applications, services, and/or data that are accessible via the one or more private network circuits managed by PoP 101, and a second set of applications, services, and/or data that are accessible via the one or more public IP network circuits managed by PoP 101.

Process 400 may include classifying (at 408) the ingress data packets. Classifying (at 408) the ingress data packets may include determining a classification for each data packet based on the DSCP header parameter of that data packet, wherein the DSCP header parameter may be populated by different network routers or CPE according to a DPI signature pack that is associated with the configured policies at PoP 101. In some embodiments, some of the ingress data packets may traverse a circuit of CPEs or network routers that are operated by a particular entity, and the CPEs or network routers may be configured with the same DPI signature pack. In some other embodiments, some of the ingress data packets may traverse a circuit that includes CPEs or network routers operated by different entities and/or that are configured with different DPI signature packs. In some such embodiments, classifying (at 408) the ingress data packets may include inspecting the data packets at PoP 101, and providing a new DSCP classification based on the DPI signature pack that is associated with the configured policies. The DPI signature pack may define a DSCP classification for each type of data packet identified from the inspection.

Process 400 may include determining (at 410) different policies that apply to the different classified ingress data packets. For instance, the policies may include a first routing policy and/or first QoS parameters for routing ingress data packets tagged with a first identifier (e.g., the AF31 tag), and a second routing policy and/or second QoS parameters for routing ingress data packets tagged with a second identifier (e.g., the AF21 tag).

Process 400 may include routing (at 412) the ingress data packets according to the different policies that are specified for the different classified data packets. Routing the ingress data packets may include dynamically allocating different amounts of bandwidth for transmitting the different types of ingress data packets through the tunnel or circuit to the particular entity site, and/or adjusting the rate at which the different types of ingress data packets or other data packets are simultaneously transferred over the tunnel or circuit to ensure that the distribution of different classified data packets, that compete for tunnel or circuit bandwidth, conform to the policies for that tunnel or circuit.

Routing (at 412) the ingress data packets may also include implementing security policies from the policies before sending the ingress data packets to the particular entity site. The firewall application or device within PoP 101 may inspect and filter the data packets that violate the security policies defined for allowable traffic over the tunnel or single circuit to the particular entity site.

Performance of the hybrid private and public network circuit routing may be impacted by the distance between PoP 101 and each CPE or entity site that connects to that PoP 101. To mitigate the performance penalty (e.g., reduce latency), a network operator may deploy two or more PoPs 101 to different network locations or geographic regions (e.g., different zip codes, states, countries, etc.), and a deterministic tunnel creation procedure may be used to establish a circuit between a CPE at a particular entity site and the PoP that is the shortest physical distance from the particular entity site.

Figure 5:
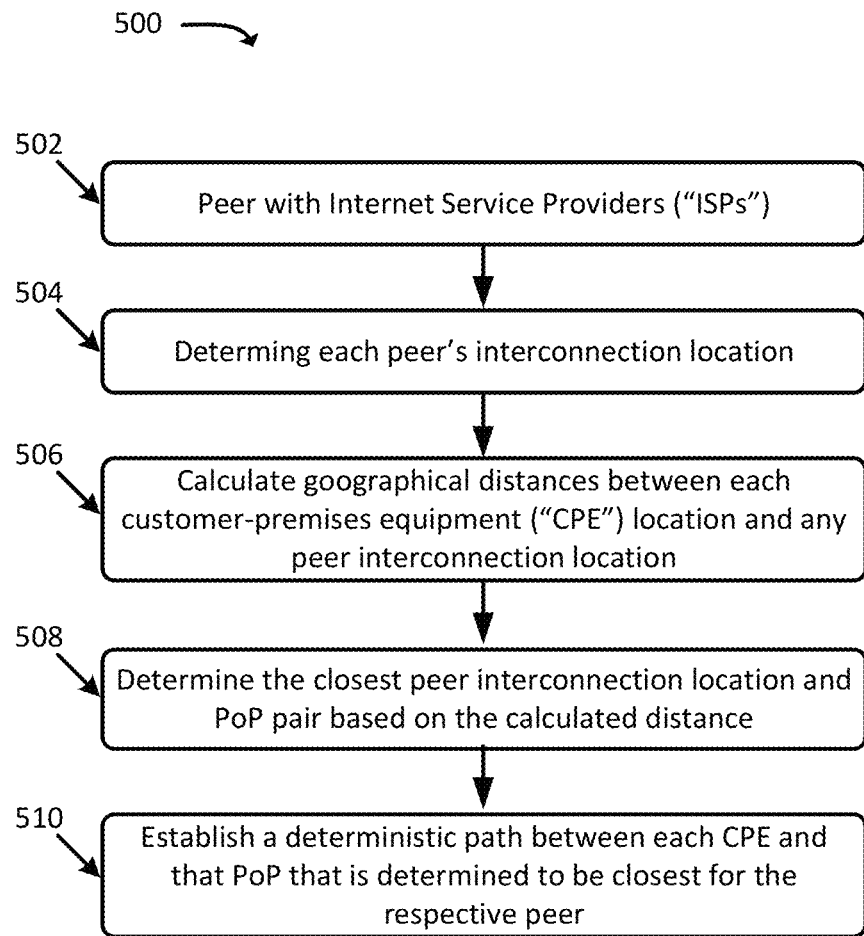
FIG. 5 presents a process for deterministic tunnel creation in accordance with some embodiments presented herein.

FIG. 5 presents a process 500 for deterministic tunnel creation in accordance with some embodiments presented herein. Process 500 may be performed by the one or more traffic management devices in each PoP or a centralized controller that configures and/or controls the traffic management devices in the different PoPs.

Process 500 may include peering (at 502) with different third-party networks used by different entity sites and/or CPEs to reach external data networks. In some embodiments, the peering (at 502) may include peering directly with Internet Service Providers ("ISPs") via Private Network Interconnects ("PNIs") or via Internet Exchange Points ("IXPs"). The peering (at 502) may include exchanging routing information between routers of the peered third-party networks and the traffic management devices in the different PoPs, and/or agreeing to route certain traffic from the peered routers to specific PoPs.

Process 500 may include determining (at 504) each peer's interconnection location. The peer interconnection locations may be determined (at 504) using the information that is exchanged when peering (at 502) with the third-party networks, from PNIs, and/or IXPs. For instance, the traffic management devices within the PoPs may produce network address maps from the routing tables exchanged with different peered devices and/or may use other location detection services or techniques to determine the location (at 504) of each peer.

Process 500 may include calculating (at 506) the geographical distances between each CPE location and any interconnection location of the determined third-party carrier resident CPE. In some embodiments, each CPE location is known or may be determined from the physical location of a corresponding entity site. The distance may be calculated (at 506) by inputting the CPE location and/or interconnection location into a mapping service, and determining the physical separation between the two.

Process 500 may include determining (at 508) the closest peer interconnection location and PoP pair based on the calculated (at 506) distance. The shortest path or distance between a peer interconnection location and a PoP location may then be used to identify the optimal path or deterministic path to the one or more CPEs that use or are otherwise associated with the peer interconnection location.

Process 500 may include establishing (at 510) a deterministic path between each particular CPE and the PoP that is determined to be closest for the peer that is used by or otherwise associated with that particular CPE. In some embodiments, establishing (at 510) the deterministic path may include building a VPN tunnel from the particular CPE to the closest PoP. In some embodiments, establishing (at 510) the deterministic path may include configuring and/or adjusting a routing table for the peer router (e.g., ISP router) to include a static route to the closest PoP for certain managed traffic coming from CPEs at entity sites that connect to a PoP for the hybrid private and public network circuit routing. In some embodiments, the managed traffic may be identified by addressing of the CPEs, labels or tagging of the data packets routed through the CPEs, and/or other differentiators found within the traffic.

Figure 6:
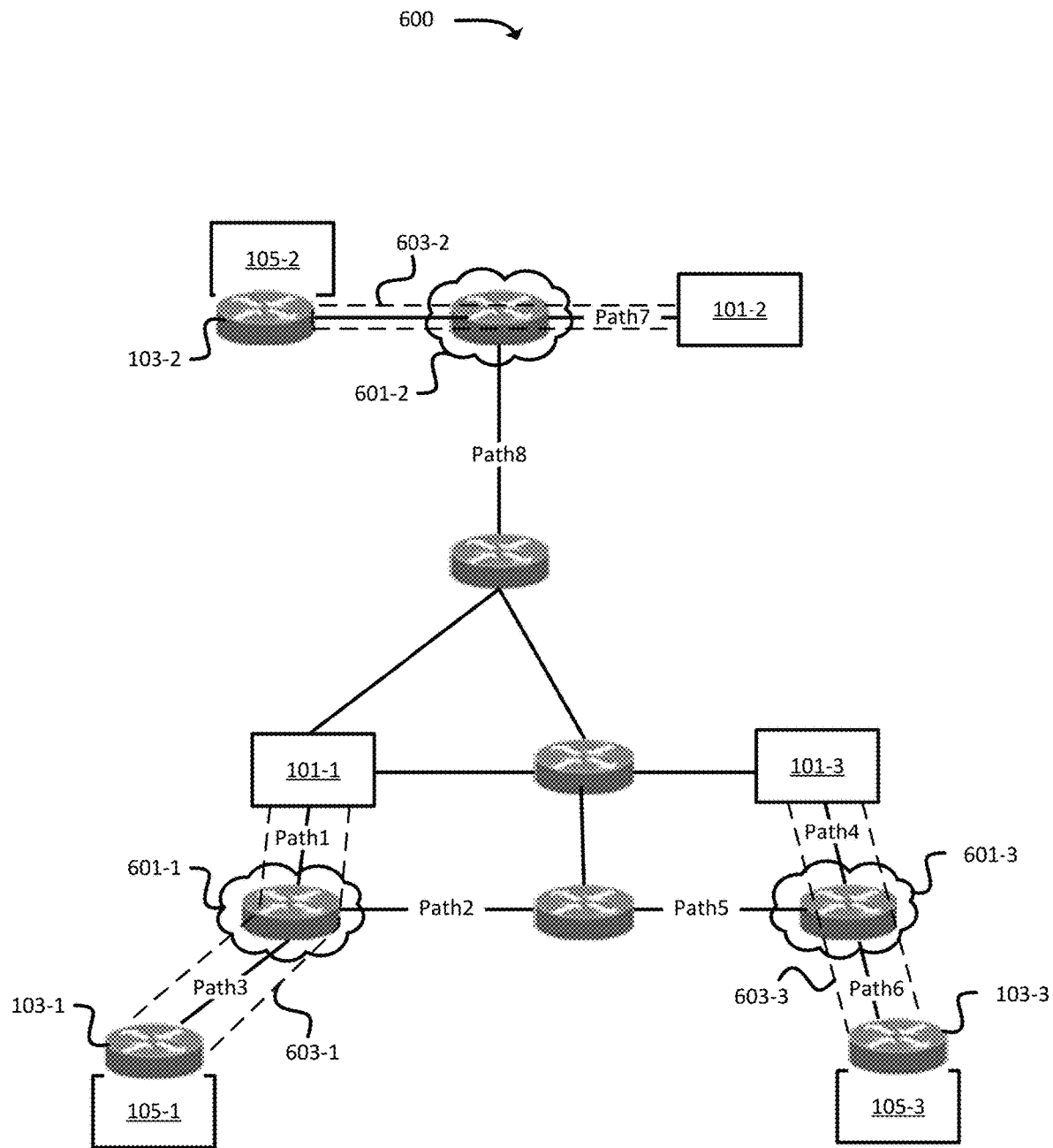
FIG. 6 illustrates an example architecture for deterministically connecting customer-premises equipment ("CPEs") at different entity sites to geographically proximate PoPs in accordance with some embodiments presented herein.

FIG. 6 illustrates an example architecture 600 for deterministically connecting CPEs at different entity sites to geographically proximate PoPs in accordance with some embodiments presented herein. Architecture 600 may include multiple PoPs 101-1, 101-2, and 101-3 (herein sometimes collectively referred to as "POPs 101" or individually as "PoP 101") that are distributed to different regions.

PoPs 101 may peer with various ISPs 601-1, 601-2, and 601-3 (herein sometimes collectively referred to as "ISPs 601" or individually as "ISP 601") to enable the deterministic path creation between entity sites 105 and PoPs 101 that are geographically most proximate to those sites 105. As shown in FIG. 6, ISP 601-1 may provide network access to devices that operate from entity site 105-1, ISP 601-2 may provide network access to devices that operate from entity site 105-2, and ISP 601-3 may provide network access to devices that operate from entity site 105-3.

As part of the peering, traffic management devices within PoP 101-1 may determine that ISP 601-1 is geographically closest to PoP 101-1, traffic management devices within PoP 101-2 may determine that ISP 601-2 is geographically closest to PoP 101-2, and traffic management devices within PoP 101-3 may determine that ISP 601-3 is geographically closest to PoP 101-3. Consequently, and as further part of the peering, first VPN tunnel 603-1 may be created between CPE 103-1 and PoP 101-1, second VPN tunnel 603-2 may be created between CPE 103-2 and PoP 101-2, and third VPN tunnel 603-3 may be created between CPE 103-3 and PoP 101-3. VPN tunnels 603-1, 603-2, and 603-3 may establish the deterministic paths or deterministic routing of traffic from the CPEs 103 to the closest PoPs 101.

To reduce the overhead of connecting different entity sites to the PoPs and providing the hybrid private and public network circuit routing services for the entity sites at the PoPs, some embodiments offer CPEs to the entity sites that self-configure upon activation or being powered on and connected to a network. For instance, an installer may receive a CPE for installation at an entity site. The installer may install the CPE at the entity site, connect the network wiring to the CPE, and turn on the CPE. The CPE may automatically connect to a PoP, communicate with the PoP to configure itself for the hybrid private and public network circuit routing services, and the PoP may correctly route traffic from the CPE across different private and public circuits according to policies defined by the entity with little or no entity interaction with the CPE.

In some embodiments, each CPE may be initially configured to provide a call home message to a Software Defined IP ("SDIP") management system upon activation or being powered on and connected to a network. The SDIP management system may include one or more devices for configuring the traffic management devices within PoPs 101 and for configuring the CPEs. In other words, the SDIP management system may administer control over the hybrid private and public network circuit routing.

The call home message may include a Simple Network Management Protocol ("SNMP") trap message. The call home message (e.g., SNMP trap message) may include or may be associated with identifying information about the CPE such as a model number, version number, serial number, and/or other information that uniquely identifies the CPE or that allows the SDIP management system to determine which entity site has ordered the hybrid private and public network circuit routing service and requires the CPE for access to the service.

The SDIP management system may verify that a pending order has been placed for the CPE with the designated model number and/or serial number, may install one or more licenses that authenticate and/or authorize the CPE to connect to a PoP and/or access the routing services, and/or may update the CPE configuration. For instance, the CPE may receive an updated DPI signature pack for classifying different types of data packets consistent with the desired routing that is specified for the different types of data packets by the policies configured for that entity site or entity operating the entity site.

Figure 7:
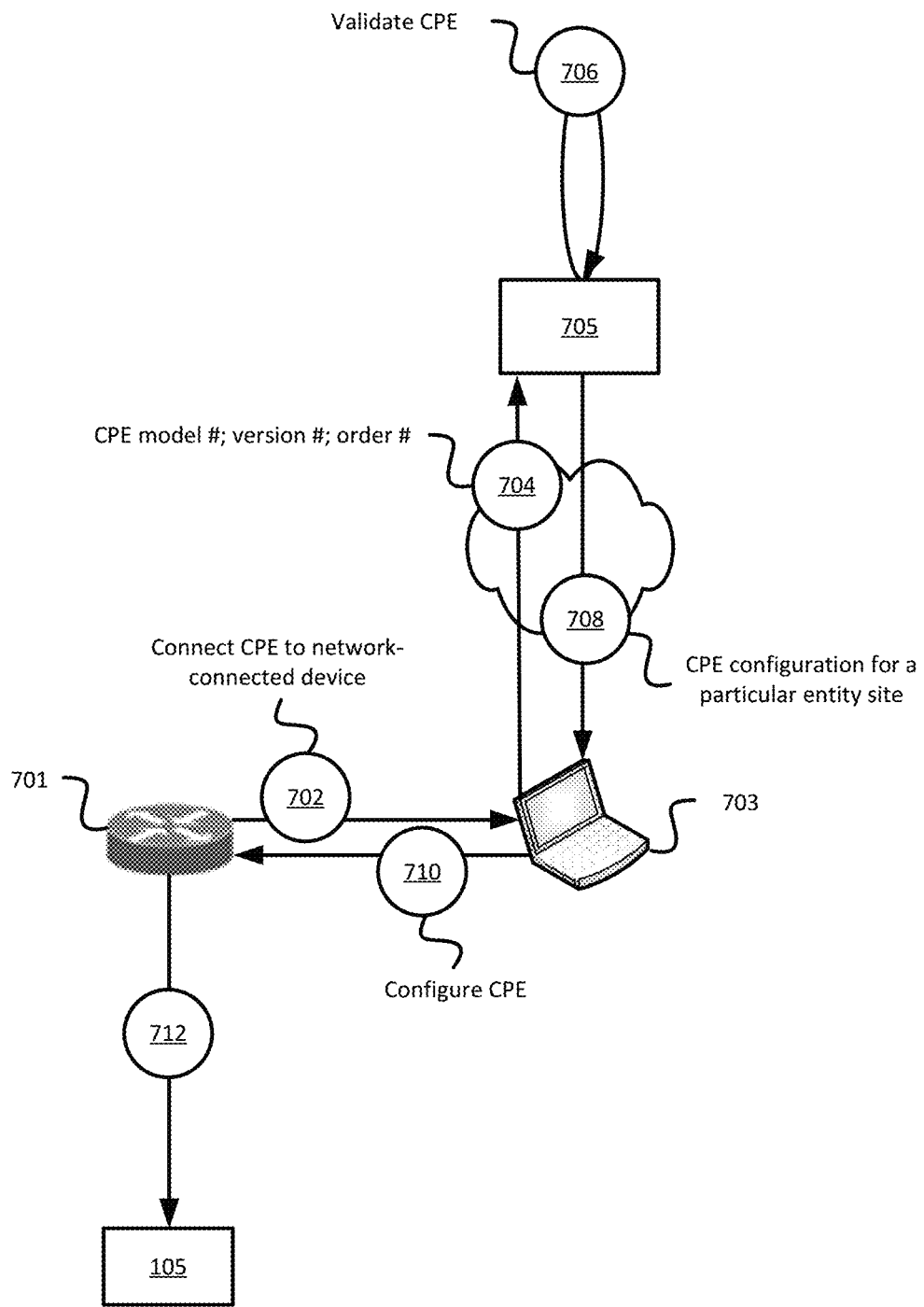
FIG. 7 illustrates an example of preparing a CPE for the zero-touch operation in accordance with some embodiments presented herein.

In some embodiments, a third-party agent may receive the CPE directly from a CPE vendor or the SDIP management system with no configuration or a basic raw configuration, may prepare the CPE for the zero-touch operation at an entity site, and may install the CPE at the entity site. FIG. 7 illustrates an example of preparing the CPE for the zero-touch operation in accordance with some embodiments presented herein.

As shown in FIG. 7, an agent may receive raw or unconfigured CPE 701 from a CPE vendor. The agent may be tasked with installing CPE 701 at entity site 105 in order to provide the hybrid private and public network circuit routing services for egress and ingress traffic of entity site 105.

The agent may connect (at 702) CPE 701 to configuration device 703. For instance, CPE 701 may connect to the agent's laptop via an Ethernet connection.

Configuration device 703 may access (at 704) a pre-staging portal of SDIP management system 705 using a browser or other application running on configuration device 703. As part of accessing (at 704) the pre-staging portal, configuration device 703 may provide input that identifies CPE 701 (e.g., serial number, model number, etc.) and/or the order number for entity site 105 where CPE 701 is to be installed.

SDIP management system 705 may validate (at 706) CPE 701. For instance, SDIP management system 705 may determine that the serial number and/or model number of CPE 701 matches the serial number and/or model number for the CPE that is to be installed at entity site 105 identified from the order number, and that the required interfaces for entity site 105 are available and/or recognized on CPE 701 (e.g., CPE 701 has a correct number of Ethernet ports, fiber optic ports, etc.).

In response to successfully validating (at 706) CPE 701, SDIP management system 705 may push (at 708) the correct Internetwork Operating System ("IOS"), DPI signature pack, and/or other configurations to configuration device 703, and configuration device 703 may configure (at 710) CPE 701 using the received configuration data. SDIP management system 705 may also provide a notification to configuration device 703 that instructs the agent that CPE 701 is ready for installation at entity site 105.

The agent may then transfer (at 712) CPE 701 to entity site 105, wire CPE 701 as a gateway router of entity site 105, and turn on CPE 701. CPE 701 may automatically connect to a nearest PoP 101, may forward egress traffic from entity site 105 to PoP 101, and PoP 101 may route the traffic across different network circuits with different QoS according to policies for that entity site 105.

In some embodiments, the agent may perform the pre-staging and obtain the configurations for a CPE without having access to the CPE. For instance, the CPE may be shipped to the entity site where it is to be installed, and the agent may prepare the pre-staging configurations for that CPE to a tablet, a laptop, or other configuration device before arriving at the entity site to complete the install. In some such embodiments, the agent may enter one or more order numbers of CPEs that are to be installed at one or more entity sites into the pre-staging portal of the SDIP management system. The SDIP management system may query an order database to determine the CPE that is designated for installation at each entity site, and to select the configurations and/or software for each CPE. The pre-staging portal may push the selected configurations and/or software to the agent's configuration device, and the configuration device may store the configurations and/or software in non-volatile storage.

The agent may travel to an entity site with the configuration device, may connect the configuration device directly to the CPE at the entity site, and may upload the configurations and/or software into the CPE. Once configured and powered on, the CPE may then establish a tunnel with a nearby PoP to commence service, or may connect to the SDIP management system to verify that it has been configured correctly.

Once the CPEs are operational at various entity sites, the SDIP management system may be used to update the IOS images and/or software on the CPEs. Since CPEs of different vendors may be installed at different entity sites, SDIP management system may partition each CPE's configuration into modules that may be separately updated without impacting operation of other configuration modules.

For instance, the CPE of a first vendor that is installed at a first site of a particular entity may receive an update, and the CPE of a second vendor that is installed at a second site of the particular entity may not receive an update. In this scenario, it is imperative that the SDIP management system update the CPE of the first vendor without changing the signature pack that the CPEs at the different entity sites use to classify the egress traffic. If the signature packs were to change as a result of updating the configuration of the first site CPE, then the PoP may apply different policies or may route the same traffic coming from the CPEs differently because of the different signature packs tagging the same packets with different classifications. The modular updating supported by the SDIP management system and the CPEs allows for individual configuration modules of the first site CPE to be updated without impacting other configuration modules (e.g., the signature pack) of the first site CPE.

Alternatively, an entity may want to update the signature packs at all sites without updating the IOS images and/or other configuration modules of the CPEs. In this scenario, the SDIP management system may update the signature packs on CPEs of different vendors or manufacturers without having to replace an entire image or other configuration modules for the CPEs of the different vendors or manufacturers Accordingly, when configuring a CPE via the pre-staging portal or when updating an existing CPE configuration, the SDIP management system may identify the CPE that is to be updated (e.g., model number, version number, etc.) and/or the entity site where the CPE operations. The SDIP management system may compile different configuration modules for the identified CPE. For instance, the SDIP management system may compile vendor-specific configuration modules with standard configuration modules and entity-specific configuration modules to a form a complete configuration for the identified CPE, and may configure the identified CPE with the complete configuration that is pieced together using the different configuration modules. Alternatively, the SDIP management system may determine which of the configuration modules that are currently configured on the identified CPE have changed, and may selectively update those configuration modules without replacing all configuration modules of the identified CPE.

The vendor-specific configuration modules may include configuration modules that are provided by the vendor of the identified CPE and that apply to a specific model number or version number of the identified CPE. The standard configuration modules may include configuration modules that may be used by different CPEs of different vendors. For instance, the standard configuration modules may include modules that control the routing of IPSEC, VLAN, L2TP, MPLS, and other network protocol traffic. The entity-specific configuration modules may include the DPI signature packs and/or definitions for how the CPE is to classify different types of network traffic, route maps, policy maps, and/or other entity-specific customizations.

Figure 8:
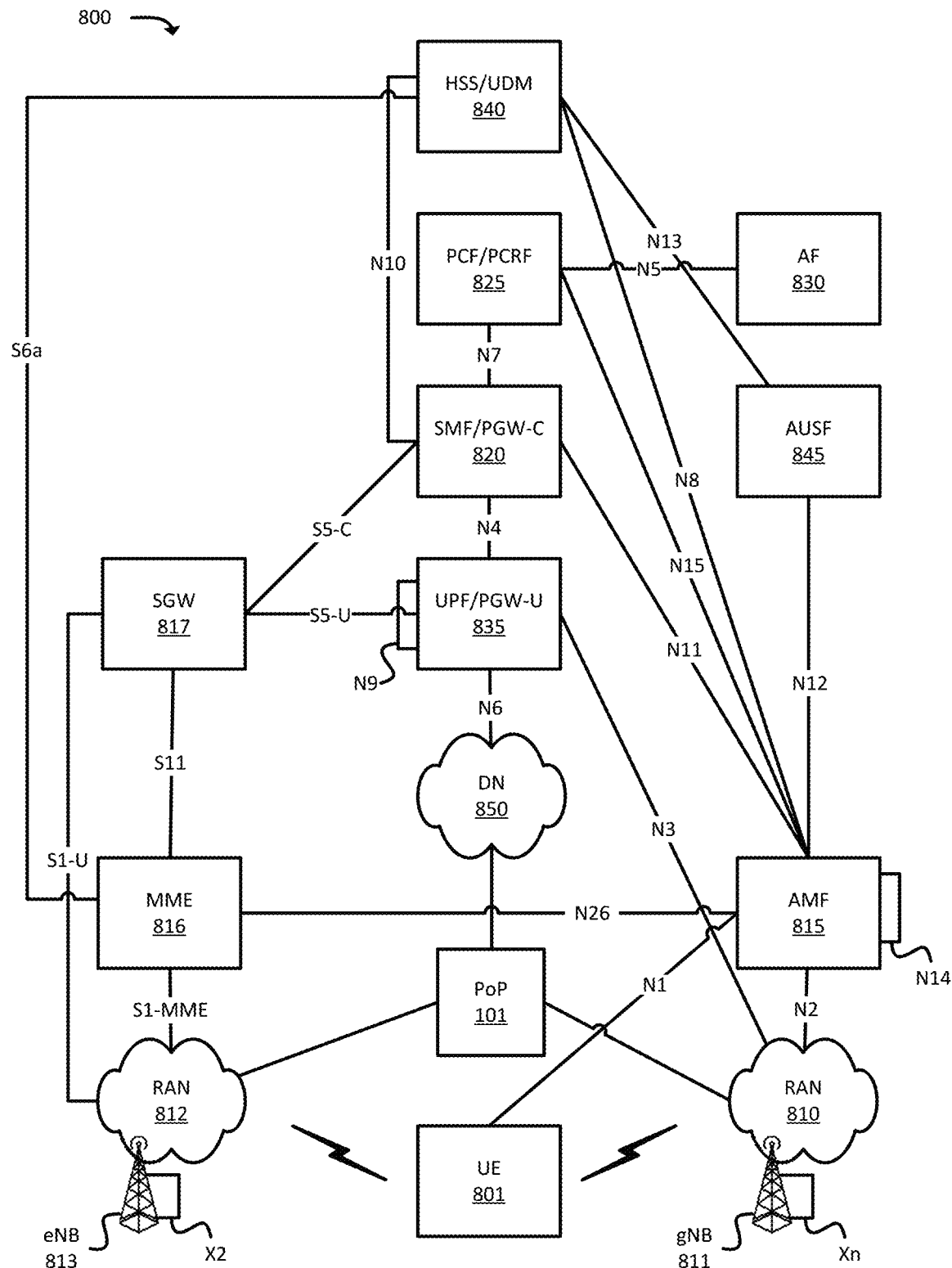
FIG. 8 illustrates an example environment, in which one or more embodiments may be implemented.

FIG. 8 illustrates an example environment 800, in which one or more embodiments may be implemented. In some embodiments, environment 800 may correspond to a Fifth Generation ("5G") network, and/or may include elements of a 5G network. In some embodiments, environment 800 may correspond to a 5G Non-Standalone ("NSA") architecture, in which a 5G radio access technology ("RAT") may be used in conjunction with one or more other RATs (e.g., a Long-Term Evolution ("LTE") RAT), and/or in which elements of a 5G core network may be implemented by, may be communicatively coupled with, and/or may include elements of another type of core network (e.g., an evolved packet core ("EPC")). As shown, environment 800 may include UE 801, RAN 810 (which may include one or more Next Generation Node Bs ("gNBs") 811), RAN 812 (which may include one or more evolved Node Bs ("eNBs") 813), and various network functions such as Access and Mobility Management Function ("AMF") 815, Mobility Management Entity ("MME") 816, Serving Gateway ("SGW") 817, Session Management Function ("SMF")/Packet Data Network ("PDN") Gateway ("PGW")-Control plane function ("PGW-C") 820, Policy Control Function ("PCF")/Policy Charging and Rules Function ("PCRF") 825, Application Function ("AF") 830, User Plane Function ("UPF")/PGW-User plane function ("PGW-U") 835, Home Subscriber Server ("HSS")/Unified Data Management ("UDM") 840, and Authentication Server Function ("AUSF") 845. Environment 800 may also include one or more networks, such as Data Network ("DN") 850. Environment 800 may include one or more additional devices or systems communicatively coupled to one or more networks (e.g., DN 850), such as PoP 101 and/or SDIP management system 705.

The example shown in FIG. 8 illustrates one instance of each network component or function (e.g., one instance of SMF/PGW-C 820, PCF/PCRF 825, UPF/PGW-U 835, HSS/UDM 840, and/or 845). In practice, environment 800 may include multiple instances of such components or functions. For example, in some embodiments, environment 800 may include multiple "slices" of a core network, where each slice includes a discrete set of network functions (e.g., one slice may include a first instance of SMF/PGW-C 820, PCF/PCRF 825, UPF/PGW-U 835, HSS/UDM 840, and/or 845, while another slice may include a second instance of SMF/PGW-C 820, PCF/PCRF 825, UPF/PGW-U 835, HSS/UDM 840, and/or 845). The different slices may provide differentiated levels of service, such as service in accordance with different Quality of Service ("QoS") parameters. Moreover, the example shown in FIG. 8 illustrates one PoP 101 that is connected to RANs 810 and 812. In practice, environment 800 may include a different PoP 101 for each RAN or for a particular set of RANs.

The quantity of devices and/or networks, illustrated in FIG. 8, is provided for explanatory purposes only. In practice, environment 800 may include additional devices and/or networks, fewer devices and/or networks, different devices and/or networks, or differently arranged devices and/or networks than illustrated in FIG. 8. For example, while not shown, environment 800 may include devices that facilitate or enable communication between various components shown in environment 800, such as routers, modems, gateways, switches, hubs, front-end interfaces, etc. Alternatively, or additionally, one or more of the devices of environment 800 may perform one or more network functions described as being performed by another one or more of the devices of environment 800. Devices of environment 800 may interconnect with each other and/or other devices via wired connections, wireless connections, or a combination of wired and wireless connections. In some implementations, one or more devices of environment 800 may be physically integrated in, and/or may be physically attached to, one or more other devices of environment 800.

UE 801 may include a computation and communication device, such as a wireless mobile communication device that is capable of communicating with RAN 810, RAN 812, and/or DN 850. UE 801 may be, or may include, a radiotelephone, a personal communications system ("PCS") terminal (e.g., a device that combines a cellular radiotelephone with data processing and data communications capabilities), a personal digital assistant ("PDA") (e.g., a device that may include a radiotelephone, a pager, Internet/intranet access, etc.), a smart phone, a laptop computer, a tablet computer, a camera, a personal gaming system, an IoT device (e.g., a sensor, a smart home appliance, or the like), a wearable device, an Internet of Things ("IoT") device, a Machine-to-Machine ("M2M") device, or another type of mobile computation and communication device. UE 801 may send traffic to and/or receive traffic (e.g., user plane traffic) from DN 850 via RAN 810, RAN 812, and/or UPF/PGW-U 835. In some embodiments, UE 801 may include the devices within entity sites 105 that generate and/or receive the network traffic from PoP 101.

RAN 810 may be, or may include, a 5G RAN that includes one or more base stations (e.g., one or more gNBs 811), via which UE 801 may communicate with one or more other elements of environment 800. UE 801 may communicate with RAN 810 via an air interface (e.g., as provided by gNB 811). For instance, RAN 810 may receive traffic (e.g., voice call traffic, data traffic, messaging traffic, signaling traffic, etc.) from UE 801 via the air interface, and may communicate the traffic to UPF/PGW-U 835, and/or one or more other devices or networks. Similarly, RAN 810 may receive traffic intended for UE 801 (e.g., from UPF/PGW-U 835, AMF 815, and/or one or more other devices or networks) and may communicate the traffic to UE 801 via the air interface.

RAN 812 may be, or may include, a LTE RAN that includes one or more base stations (e.g., one or more eNBs 813), via which UE 801 may communicate with one or more other elements of environment 800. UE 801 may communicate with RAN 812 via an air interface (e.g., as provided by eNB 813). For instance, RAN 812 may receive traffic (e.g., voice call traffic, data traffic, messaging traffic, signaling traffic, etc.) from UE 801 via the air interface, and may communicate the traffic to UPF/PGW-U 835, and/or one or more other devices or networks. Similarly, RAN 812 may receive traffic intended for UE 801 (e.g., from UPF/PGW-U 835, SGW 817, and/or one or more other devices or networks) and may communicate the traffic to UE 801 via the air interface.

RANs 810 and 812 may each include a CPE for establishing the secure tunnel to PoP 101 and for routing network traffic for one or more entity sites 105 to PoP 101. In some embodiments, the CPE may establish the secure tunnel to PoP 101 via RANs 810 and 812.

AMF 815 may include one or more devices, systems, Virtualized Network Functions ("VNFs"), etc., that perform operations to register UE 801 with the 5G network, to establish bearer channels associated with a session with UE 801, to hand off UE 801 from the 5G network to another network, to hand off UE 801 from the other network to the 5G network, manage mobility of UE 801 between RANs 810 and/or gNB s 811, and/or to perform other operations. In some embodiments, the 5G network may include multiple AMFs 815, which communicate with each other via the N14 interface (denoted in FIG. 8 by the line marked "N14" originating and terminating at AMF 815).

MME 816 may include one or more devices, systems, VNFs, etc., that perform operations to register UE 801 with the EPC, to establish bearer channels associated with a session with UE 801, to hand off UE 801 from the EPC to another network, to hand off UE 801 from another network to the EPC, manage mobility of UE 801 between RANs 812 and/or eNBs 813, and/or to perform other operations.

SGW 817 may include one or more devices, systems, VNFs, etc., that aggregate traffic received from one or more eNBs 813 and send the aggregated traffic to an external network or device via UPF/PGW-U 835. Additionally, SGW 817 may aggregate traffic received from one or more UPF/PGW-Us 835 and may send the aggregated traffic to one or more eNBs 813. SGW 817 may operate as an anchor for the user plane during inter-eNB handovers and as an anchor for mobility between different telecommunication networks or RANs (e.g., RANs 810 and 812).

SMF/PGW-C 820 may include one or more devices, systems, VNFs, etc., that gather, process, store, and/or provide information in a manner described herein. SMF/PGW-C 820 may, for example, facilitate the establishment of communication sessions on behalf of UE 801. In some embodiments, the establishment of communications sessions may be performed in accordance with one or more policies provided by PCF/PCRF 825.

PCF/PCRF 825 may include one or more devices, systems, VNFs, etc., that aggregate information to and from the 5G network and/or other sources. PCF/PCRF 825 may receive information regarding policies and/or subscriptions from one or more sources, such as subscriber databases and/or from one or more users (such as, for example, an administrator associated with PCF/PCRF 825).

AF 830 may include one or more devices, systems, VNFs, etc., that receive, store, and/or provide information that may be used in determining parameters (e.g., quality of service parameters, charging parameters, or the like) for certain applications.

UPF/PGW-U 835 may include one or more devices, systems, VNFs, etc., that receive, store, and/or provide data (e.g., user plane data). For example, UPF/PGW-U 835 may receive user plane data (e.g., voice call traffic, data traffic, etc.), destined for UE 801, from DN 850, and may forward the user plane data toward UE 801 (e.g., via RAN 810, SMF/PGW-C 820, and/or one or more other devices). In some embodiments, multiple UPFs 835 may be deployed (e.g., in different geographical locations), and the delivery of content to UE 801 may be coordinated via the N8 interface (e.g., as denoted in FIG. 8 by the line marked "N9" originating and terminating at UPF/PGW-U 835). Similarly, UPF/PGW-U 835 may receive traffic from UE 801 (e.g., via RAN 810, SMF/PGW-C 820, and/or one or more other devices), and may forward the traffic toward DN 850. In some embodiments, UPF/PGW-U 835 may communicate (e.g., via the N4 interface) with SMF/PGW-C 820, regarding user plane data processed by UPF/PGW-U 835.

HSS/UDM 840 and AUSF 845 may include one or more devices, systems, VNFs, etc., that manage, update, and/or store, in one or more memory devices associated with AUSF 845 and/or HSS/UDM 840, profile information associated with a subscriber. AUSF 845 and/or HSS/UDM 840 may perform authentication, authorization, and/or accounting operations associated with the subscriber and/or a communication session with UE 801.

DN 850 may include one or more wired and/or wireless networks. For example, DN 850 may include an IP-based PDN, a wide area network ("WAN") such as the Internet, a private enterprise network, and/or one or more other networks. UE 801 may communicate, through DN 850, with data servers, other UEs 801, and/or to other servers or applications that are coupled to DN 850. DN 850 may be connected to one or more other networks, such as a public switched telephone network ("PSTN"), a public land mobile network ("PLMN"), and/or another network. DN 850 may be connected to one or more devices, such as content providers, applications, web servers, and/or other devices, with which UE 801 may communicate.

PoP 101 may include one or more devices, systems, VNFs, that perform one or more operations described herein. For example, PoP 101 may perform the hybrid PIP and public IP network circuit routing for network traffic originating from RANs 810 and/or 812 as well as for private network circuits and/or public IP network circuits between PoP 101 and destinations in DN 850 or other RANs of environment 800.

Figure 9:
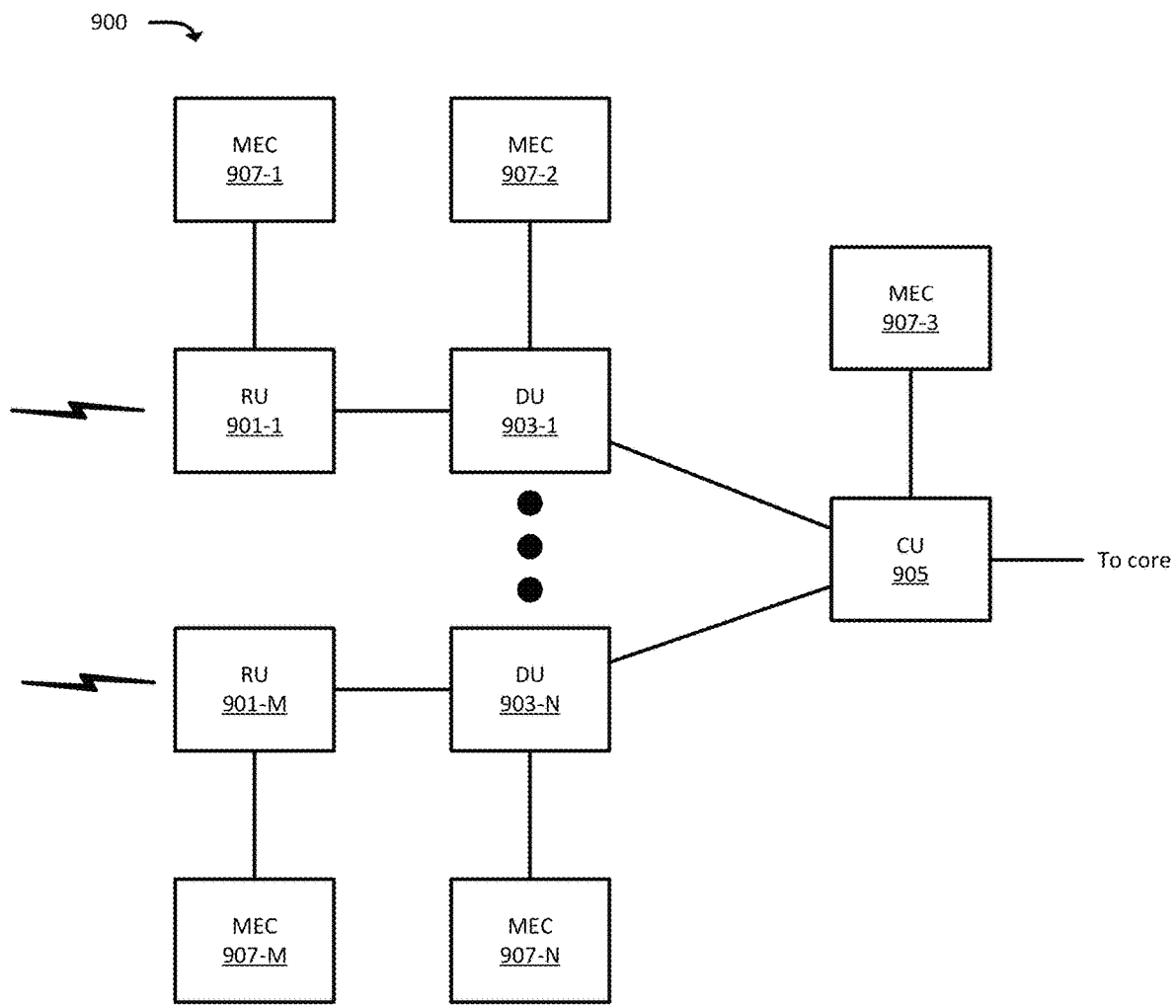
FIG. 9 illustrates an example arrangement of a Radio Access Network ("RAN"), in accordance with some embodiments.

FIG. 9 illustrates an example Distributed Unit ("DU") network 900, which may be included in and/or implemented by one or more RANs (e.g., RAN 810, RAN 812, or some other RAN). In some embodiments, a particular RAN may include one DU network 900. In some embodiments, a particular RAN may include multiple DU networks 900. In some embodiments, DU network 900 may correspond to a particular gNB 811 of a 5G RAN (e.g., RAN 810). In some embodiments, DU network 900 may correspond to multiple gNB s 811. In some embodiments, DU network 900 may correspond to one or more other types of base stations of one or more other types of RANs. As shown, DU network 900 may include Central Unit ("CU") 905, one or more Distributed Units ("DUs") 903-1 through 903-N (referred to individually as "DU 903," or collectively as "DUs 903"), and one or more Radio Units ("Rus") 901-1 through 901-M (referred to individually as "RU 901," or collectively as "RUs 901").

CU 905 may communicate with a core of a wireless network (e.g., may communicate with one or more of the devices or systems described above with respect to FIG. 8, such as AMF 815 and/or UPF/PGW-U 835). In the uplink direction (e.g., for traffic from UEs 801 to a core network), CU 905 may aggregate traffic from DUs 903, and forward the aggregated traffic to the core network. In some embodiments, CU 905 may receive traffic according to a given protocol (e.g., Radio Link Control ("RLC")) from DUs 903, and may perform higher-layer processing (e.g., may aggregate/process RLC packets and generate Packet Data Convergence Protocol ("PDCP") packets based on the RLC packets) on the traffic received from DUs 903.

In accordance with some embodiments, CU 905 may receive downlink traffic (e.g., traffic from the core network) for a particular UE 801, and may determine which DU(s) 903 should receive the downlink traffic. DU 903 may include one or more devices that transmit traffic between a core network (e.g., via CU 905) and UE 801 (e.g., via a respective RU 901). DU 903 may, for example, receive traffic from RU 901 at a first layer (e.g., physical ("PHY") layer traffic, or lower PHY layer traffic), and may process/aggregate the traffic to a second layer (e.g., upper PHY and/or RLC). DU 903 may receive traffic from CU 905 at the second layer, may process the traffic to the first layer, and provide the processed traffic to a respective RU 901 for transmission to UE 801.

RU 901 may include hardware circuitry (e.g., one or more RF transceivers, antennas, radios, and/or other suitable hardware) to communicate wirelessly (e.g., via an RF interface) with one or more UEs 801, one or more other DUs 903 (e.g., via RUs 901 associated with DUs 903), and/or any other suitable type of device. In the uplink direction, RU 901 may receive traffic from UE 801 and/or another DU 903 via the RF interface and may provide the traffic to DU 903. In the downlink direction, RU 901 may receive traffic from DU 903, and may provide the traffic to UE 801 and/or another DU 903.

RUs 901 may, in some embodiments, be communicatively coupled to one or more Multi-Access/Mobile Edge Computing ("MEC") devices, referred to sometimes herein simply as "MECs" 907. For example, RU 901-1 may be communicatively coupled to MEC 907-1, RU 901-M may be communicatively coupled to MEC 907-M, DU 903-1 may be communicatively coupled to MEC 907-2, DU 903-N may be communicatively coupled to MEC 907-N, CU 905 may be communicatively coupled to MEC 907-3, and so on. MECs 907 may include hardware resources (e.g., configurable or provisionable hardware resources) that may be configured to provide services and/or otherwise process traffic to and/or from UE 801, via a respective RU 901.

For example, RU 901-1 may route some traffic, from UE 801, to MEC 907-1 instead of to a core network (e.g., via DU 903 and CU 905). MEC 907-1 may process the traffic, perform one or more computations based on the received traffic, and may provide traffic to UE 801 via RU 901-1. In this manner, ultra-low latency services may be provided to UE 801, as traffic does not need to traverse DU 903, CU 905, and an intervening backhaul network between DU network 900 and the core network. In some embodiments, each MEC 907 may correspond to different PoP 101 where the hybrid PIP and public IP network circuit routing is performed.

Figure 10:
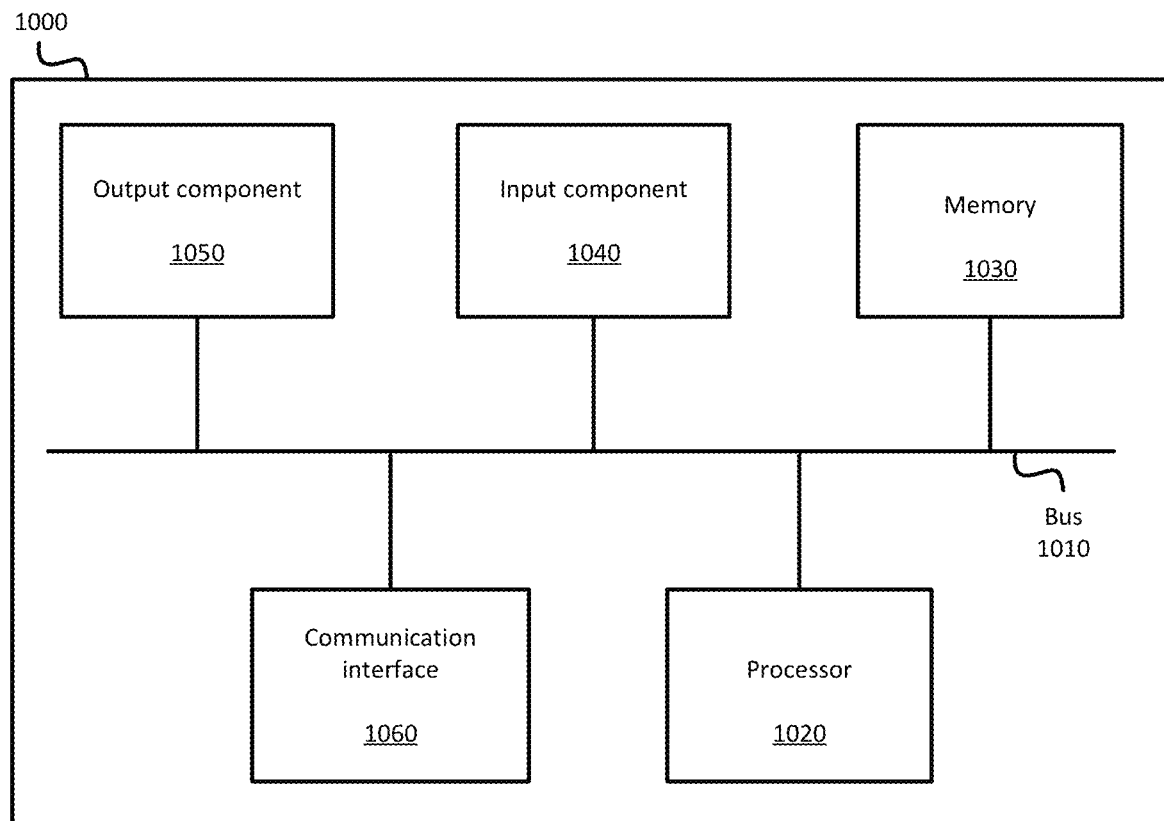
FIG. 10 illustrates example components of one or more devices, in accordance with one or more embodiments described herein.

FIG. 10 illustrates example components of device 1000. One or more of the devices described above may include one or more devices 1000. Device 1000 may include bus 1010, processor 1020, memory 1030, input component 1040, output component 1050, and communication interface 1060. In another implementation, device 1000 may include additional, fewer, different, or differently arranged components.

Bus 1010 may include one or more communication paths that permit communication among the components of device 1000. Processor 1020 may include a processor, microprocessor, or processing logic that may interpret and execute instructions. Memory 1030 may include any type of dynamic storage device that may store information and instructions for execution by processor 1020, and/or any type of non-volatile storage device that may store information for use by processor 1020.

Input component 1040 may include a mechanism that permits an operator to input information to device 1000 and/or other receives or detects input from a source external to 1040, such as a touchpad, a touchscreen, a keyboard, a keypad, a button, a switch, a microphone or other audio input component, etc. In some embodiments, input component 1040 may include, or may be communicatively coupled to, one or more sensors, such as a motion sensor (e.g., which may be or may include a gyroscope, accelerometer, or the like), a location sensor (e.g., a Global Positioning System ("GPS")-based location sensor or some other suitable type of location sensor or location determination component), a thermometer, a barometer, and/or some other type of sensor. Output component 1050 may include a mechanism that outputs information to the operator, such as a display, a speaker, one or more light emitting diodes ("LEDs"), etc.

Communication interface 1060 may include any transceiver-like mechanism that enables device 1000 to communicate with other devices and/or systems. For example, communication interface 1060 may include an Ethernet interface, an optical interface, a coaxial interface, or the like. Communication interface 1060 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 1000 may include more than one communication interface 1060. For instance, device 1000 may include an optical interface and an Ethernet interface.

Device 1000 may perform certain operations relating to one or more processes described above. Device 1000 may perform these operations in response to processor 1020 executing software instructions stored in a computer-readable medium, such as memory 1030. A computer-readable medium may be defined as a non-transitory memory device. A memory device may include space within a single physical memory device or spread across multiple physical memory devices. The software instructions may be read into memory 1030 from another computer-readable medium or from another device. The software instructions stored in memory 1030 may cause processor 1020 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

For example, while series of blocks and/or signals have been described above (e.g., with regard to FIGS. 1-7), the order of the blocks and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

The actual software code or specialized control hardware used to implement an embodiment is not limiting of the embodiment. Thus, the operation and behavior of the embodiment has been described without reference to the specific software code, it being understood that software and control hardware may be designed based on the description herein.

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

To the extent the aforementioned implementations collect, store, or employ personal information of individuals, groups or other entities, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various access control, encryption and anonymization techniques for particularly sensitive information.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A device, comprising:
one or more processors configured to:
maintain a set of egress policies indicating whether to forward received traffic to a first set of devices or a second set of devices;
maintain a set of ingress policies including a particular ingress policy associating the first set of devices with one or more Quality of Service ("QoS") policies;
identify a first set of attributes of first received traffic;
compare the first set of attributes of the first received traffic to the set of egress policies;
determine, based on comparing the first set of attributes of the first received traffic to the set of egress policies, that the first received traffic should be forwarded to the first set of devices;
forward the first received traffic to the first set of devices;
identify a second set of attributes of second received traffic;
compare the second set of attributes of the second received traffic to the set of egress policies;
determine, based on comparing the second set of attributes of the second received traffic to the set of egress policies, that the second received traffic should be forwarded to the second set of devices;
forward the second received traffic to the second set of devices;
receive third traffic from the first set of devices, wherein the third traffic includes a first QoS parameter;
modify the third traffic based on the particular ingress policy, wherein modifying the third traffic includes:
replacing the first QoS parameter, included in the third traffic, with a second QoS parameter that is associated with the one or more QoS policies associated with the particular ingress policy; and
forward the modified third traffic, including the second QoS parameter, to one or more network devices.

2. The device of claim 1, wherein identifying the first set of attributes of the first received traffic includes performing deep packet inspection on the first received traffic to identify the first set of attributes of the first received traffic.

3. The device of claim 1, wherein identifying the first set of attributes of the first received traffic includes identifying particular values included in header information of the first received traffic to identify the first set of attributes of the first received traffic.

4. The device of claim 3, wherein the particular values include class identifiers included in a Differentiated Services Code Point ("DSCP") header of the first received traffic.

5. The device of claim 1, wherein the first set of devices is associated with a first network circuit and wherein the second set of devices is associated with a second network circuit.

6. The device of claim 1, wherein the first and second received traffic are received via a same particular tunnel.

7. The device of claim 6, wherein the particular tunnel is a tunnel between the device and another particular device.

8. A non-transitory computer-readable medium, storing a plurality of processor-executable instructions to:
maintain a set of egress policies indicating whether to forward received traffic to a first set of devices or a second set of devices;
maintain a set of ingress policies including a particular ingress policy associating the first set of devices with one or more Quality of Service ("QoS") policies;
identify a first set of attributes of first received traffic;
compare the first set of attributes of the first received traffic to the set of egress policies;
determine, based on comparing the first set of attributes of the first received traffic to the set of egress policies, that the first received traffic should be forwarded to the first set of devices;
forward the first received traffic to the first set of devices;
identify a second set of attributes of second received traffic;
compare the second set of attributes of the second received traffic to the set of egress policies;
determine, based on comparing the second set of attributes of the second received traffic to the set of egress policies, that the second received traffic should be forwarded to the second set of devices;
forward the second received traffic to the second set of devices;
receive third traffic from the first set of devices, wherein the third traffic includes a first QoS parameter;
modify the third traffic based on the particular ingress policy, wherein modifying the third traffic includes:
replacing the first QoS parameter, included in the third traffic, with a second QoS parameter that is associated with the one or more QoS policies associated with the particular ingress policy; and
forward the modified third traffic, including the second QoS parameter, to one or more network devices.

9. The non-transitory computer-readable medium of claim 8, wherein identifying the first set of attributes of the first received traffic includes performing deep packet inspection on the first received traffic to identify the first set of attributes of the first received traffic.

10. The non-transitory computer-readable medium of claim 8, wherein identifying the first set of attributes of the first received traffic includes identifying particular values included in header information of the first received traffic to identify the first set of attributes of the first received traffic.

11. The non-transitory computer-readable medium of claim 10, wherein the particular values include class identifiers included in a Differentiated Services Code Point ("DSCP") header of the first received traffic.

12. The non-transitory computer-readable medium of claim 8, wherein the first set of devices is associated with a first network circuit and wherein the second set of devices is associated with a second network circuit.

13. The non-transitory computer-readable medium of claim 8, wherein the first and second received traffic are received via a same particular tunnel.

14. The non-transitory computer-readable medium of claim 8, wherein the first and second received traffic are received from a same particular device.

15. A method, comprising:

maintaining a set of egress policies indicating whether to forward received traffic to a first set of devices or a second set of devices;

maintaining a set of ingress policies including a particular ingress policy associating the first set of devices with one or more Quality of Service ("QoS") policies;

identifying a first set of attributes of first received traffic;

comparing the first set of attributes of the first received traffic to the set of egress policies;

determining, based on comparing the first set of attributes of the first received traffic to the set of egress policies, that the first received traffic should be forwarded to the first set of devices;

forwarding the first received traffic to the first set of devices;

identifying a second set of attributes of second received traffic;

comparing the second set of attributes of the second received traffic to the set of egress policies;

determining, based on comparing the second set of attributes of the second received traffic to the set of egress policies, that the second received traffic should be forwarded to the second set of devices;

forwarding the second received traffic to the second set of devices;

receiving third traffic from the first set of devices, wherein the third traffic includes a first QoS parameter;

modifying the third traffic based on the particular ingress policy, wherein modifying the third traffic includes:

replacing the first QoS parameter, included in the third traffic, with a second QoS parameter that is associated with the one or more QoS policies associated with the particular ingress policy; and forwarding the modified third traffic, including the second QoS parameter, to one or more network devices.

16. The method of claim 15, wherein identifying the first set of attributes of the first received traffic includes performing deep packet inspection on the first received traffic to identify the first set of attributes of the first received traffic.

17. The method of claim 15, wherein identifying the first set of attributes of the first received traffic includes identifying particular values included in header information of the first received traffic to identify the first set of attributes of the first received traffic.

18. The method of claim 17, wherein the particular values include class identifiers included in a Differentiated Services Code Point ("DSCP") header of the first received traffic.

19. The method of claim 15, wherein the first set of devices is associated with a first network circuit and wherein the second set of devices is associated with a second network circuit.

20. The method of claim 15, wherein the first and second received traffic are received via a same particular tunnel.

* * * * *